Figure 1:
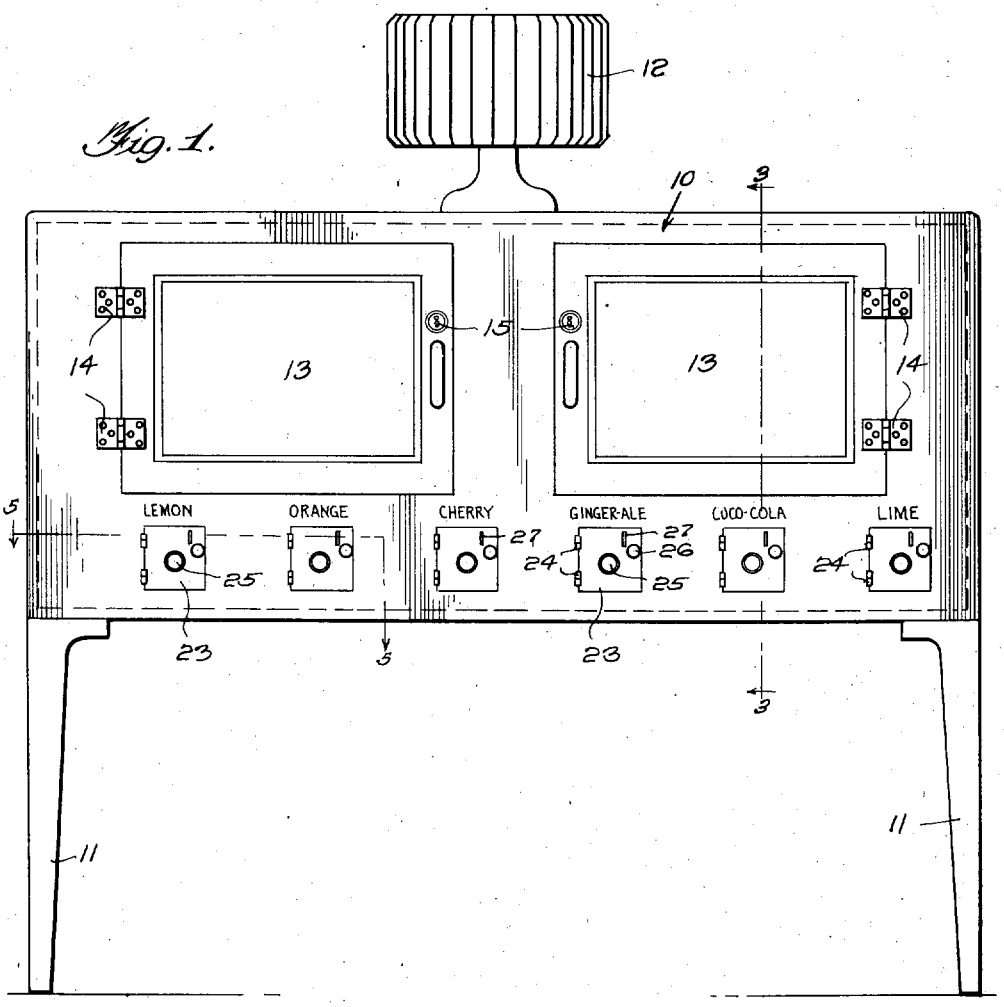

R. M. COPE

May 5, 1931. VENDING MACHINE Re. 18,059

Original Filed Aug. 11, 1928 3 Sheets-Sheet 1

INVENTOR.
RAY M. COPE,
BY Jerry A. Matthews
ATTORNEY.

R. M. COPE
VENDING MACHINE
May 5, 1931.
Re. 18,059
3 Sheets-Sheet 2
Original Filed Aug. 11, 1928
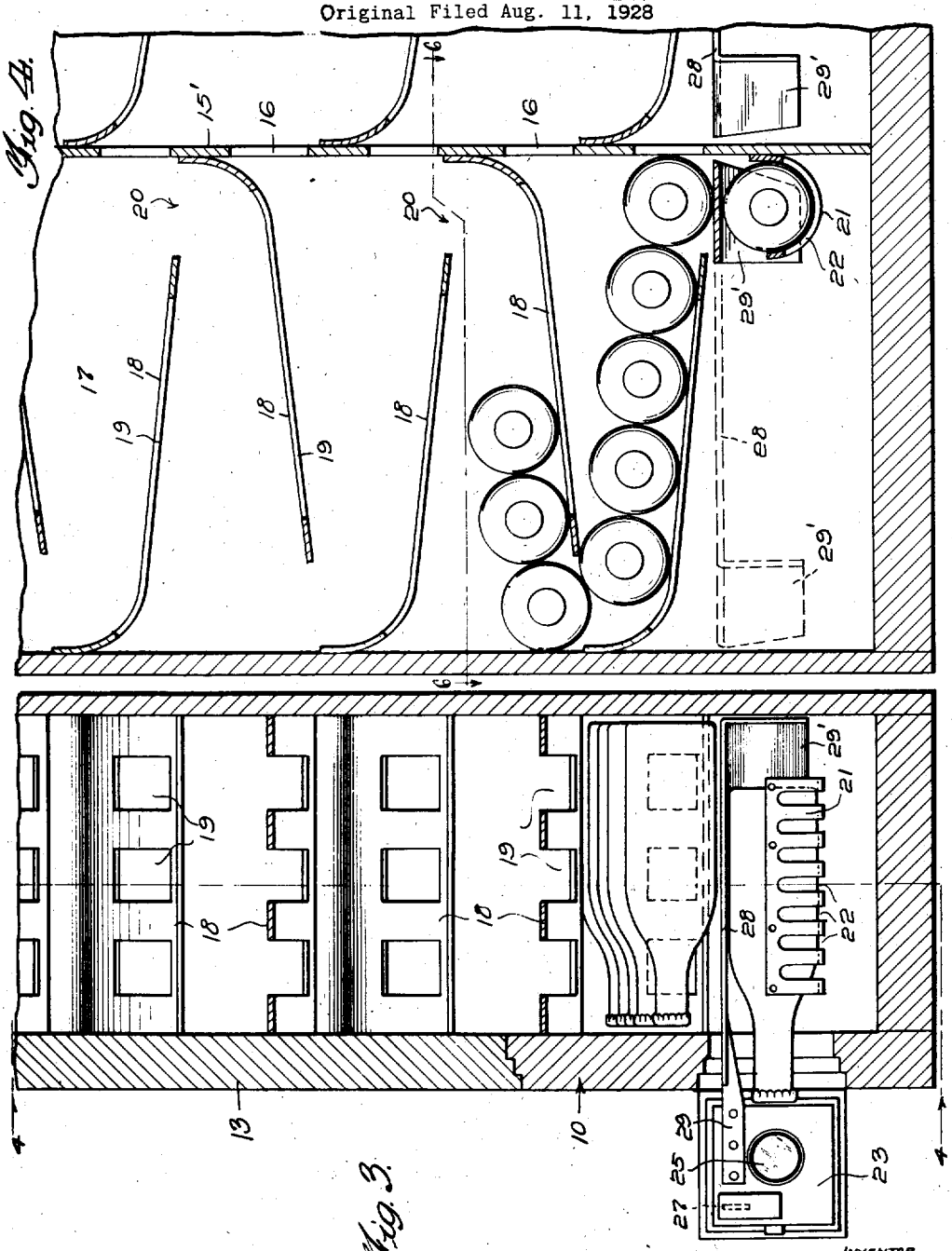
INVENTOR
BY RAY M. COPE,
Jerry A. Mathews
ATTORNEY.

R. M. COPE
May 5, 1931. VENDING MACHINE Re. 18,059
Original Filed Aug. 11, 1928 3 Sheets-Sheet 3
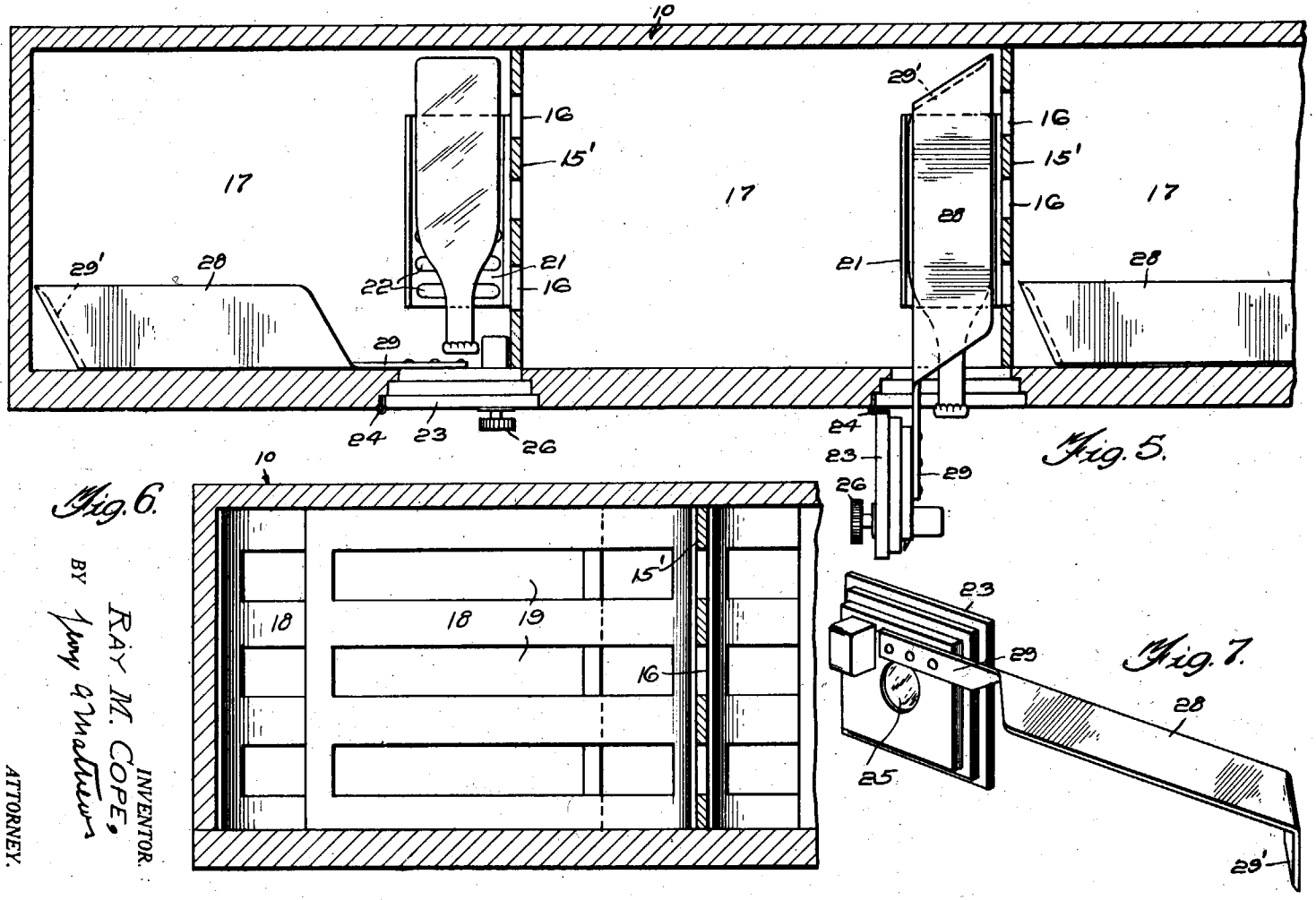
INVENTOR.
RAY M. COPE,
BY Guy A. Matthews
ATTORNEY.

Reissued May 5, 1931

Re. 18,059

UNITED STATES PATENT OFFICE

RAYMOND M. COPE, OF CHICAGO, ILLINOIS, ASSIGNOR, BY DIRECT AND MESNE ASSIGNMENTS, OF ONE-TENTH TO CHARLES VENEMAN AND FORTY-FIVE ONE-HUNDREDTHS TO WARREN A. JACKSON

VENDING MACHINE

Original No. 1,742,581, dated January 7, 1930, Serial No. 299,061, filed August 11, 1928. Application for reissue filed July 9, 1930. Serial No. 466,894.

My invention relates to vending machines.

In accordance with my invention, I provide a vending machine, which is adapted for vending bottled goods, such as, soft drinks, while not necessarily restricted to this use. The machine embodies generally a casing, of such a shape and size that it may be divided into a plurality of units. Each unit has a substantially greater vertical dimension than horizontal dimension. Within each unit are disposed inclined trays or supports, upon which bottles rest, in a manner to permit of their free rolling action. By having the compartment of a much greater vertical dimension than horizontal dimension, a large number of trays or supports are employed, and each tray or support is relatively short. The trays provide a zig-zag passage way for the bottles. The set of bottles on each tray is relatively short, thus reducing pressure or frictional engagement between the bottles in each set. This is important, as it permits of the free rotation of the bottles and eliminates the possibility of the bottles breaking, in movement, or binding in their rolling action, which frequently occurs, if the inclined tray or support is long, whereby there is a large number of bottles in each set. The casing is divided into a plurality of vertical compartments, as stated, by partitions, and these partitions, as well as the trays or supports, are provided with openings. These openings afford the free circulation of air through all portions of the casing, and in addition, lighten and cheapen the construction. The openings in the trays or supports extend throughout the major portion of their length, and also serve to reduce the contact areas between the trays and bottles, and hence reduce the friction between the trays and bottles. A refrigerating unit is preferably mounted exteriorly of the casing, upon the top thereof, and supplies the chilled air to the casing, which circulates through all portions thereof, thus properly cooling the bottles. The casing is preferably provided with relatively large doors to afford access to the interior thereof for refilling the casing, each door affords access to a plurality of vertical compartments. Each vertical compartment is provided with a vending door, controlled by a coin controlled lock. Upon the insertion of a coin, the vending door may be opened. The vending door is preferably hinged and when swung to the open position, a dividing plate or element, preferably rigidly secured thereto, is moved between the lowermost bottle and the adjacent bottle, supporting the adjacent bottle so that it can not move downwardly. Preferably formed integral with the dividing plate or element is an ejector plate or element, which is angularly arranged, and adapted to engage behind the bottom of the bottle, and to automatically shift the same forwardly, so that its neck projects a suitable distance forwardly beyond the casing. This enables the bottle to be conveniently removed by the operator. The entire machine is very compact, neat and attractive in appearance, and is entirely free of pivoted operating parts, such as levers, whereby the operation of the machine is simple and reliable.

Figure 2:
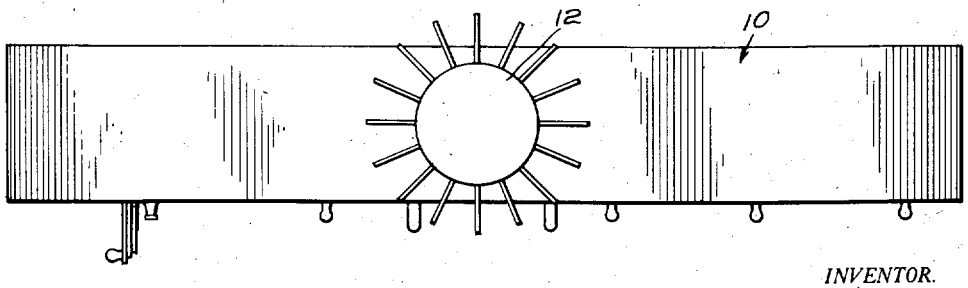

In the accompanying drawings, forming a part of this specification, and in which like numerals are employed to designate like parts throughout the same, Figure 1 is a side elevation of a vending machine embodying my invention, Figure 2 is a plan view of the same, Figure 3 is a central vertical transverse section taken on line 3—3 of Figure 1, the vending door being shown open, Figure 4 is a central vertical longitudinal section taken on line 4—4 of Figure 3, parts broken away, Figure 5 is a horizontal section taken on line 5—5 of Figure 1, Figure 6 is a detailed horizontal section taken on line 6—6 of Figure 4, and, Figure 7 is a perspective view of the vending door and associated elements.

In the drawings, wherein for the purpose of illustration is shown a preferred embodiment of my invention, the numeral 10 designates a casing as a whole, which is preferably rectangular, and preferably has a greater longitudinal dimension than a vertical dimension. This casing is supported by legs 11, as shown. The numeral 12 designates a refrigerating unit, such as is now being manufactured, and this unit is mounted upon the top of the casing 10, and is adapted to supply cooled air to the interior of the casing, such air entering at the top of the casing and descending therein.

The casing 10 is provided upon its front side with openings which are normally closed by doors 13, hinged upon the same as shown at 14. These doors may be held in the closed position by locks 15, of any well known or preferred type. By opening the doors 13, access may be had to the various compartments within the casing, for replenishing the supply of bottles.

Arranged within the casing 10 are vertical partitions 15¹, rigidly held in place by any suitable means, and these partitions have relatively large air circulating openings 16, as shown. The partitions 15 divide the casing into vertical compartments 17, the number of compartments varying with the length of the casing. Each compartment has a substantially greater vertical dimension than horizontal dimension.

Arranged within the compartments are inclined staggered supporting elements or trays 18, providing tortuous passages, as shown. The upper ends of one set of trays 18 in the end compartments 17 are attached to the ends of the casing, and the other set of trays have their upper ends attached to the partition 15¹. In the intermediate compartments, both sets of trays are secured to the partitions. The trays 18 are provided with relatively large longitudinal openings 19, extending throughout the major portion of their length. These openings serve to lighten and cheapen the construction of the trays, permitting of the free circulation of the air through the trays, and also reducing the area of contact between the trays and the bottles supported thereon, causing the bottles to roll with reduced friction. The lower end of the upper tray 18 is spaced from the upper end of the next lower tray, affording openings 20, for the passage of the bottles.

Arranged within the bottom of each compartment 17 is a bottle receiver 21, which is rigidly attached to the partition 15¹, or the end of the casing 10, as may be required. This bottle receiver is substantially semi-circular in cross section and is provided with transverse openings 22 for the circulation of air and to reduce the friction between the same and the bottle. The longitudinal axis of the bottle receiver 21 is at a right angle to the longitudinal axis of the adjacent inclined tray 18, as shown. The rear end of the bottle receiver 21 is spaced from the back wall of the casing 10, to provide for the travel of an ejector, to be described.

Each vertical compartment 17 is provided in the front wall of the casing 10 with a vending opening, to be closed by a vending door 23, hinged to the casing as shown at 24, to swing horizontally. Each door 23 is provided with a glass covered peep-hole 25, so that the operator may ascertain if the compartment is filled or empty. Each door is further provided with a coin controlled lock device embodying a knob 26, and a slot 27 for receiving the coin. Upon the insertion of a coin into the slot 27, the lock device 26 may be actuated so that the door 23 may be swung to the open position. When the door is again closed, the lock device 26, will hold the door locked in the closed position, until another coin has been inserted into the slot 27. The door 23 of each vertical compartment 17 is in alinement with the bottle receiver 21.

The numeral 28 designates a horizontally swinging separator, or plate, having a shank 29, which is rigidly attached to the inner side of the vending door 23. The separator swings horizontally with the vending door. When the vending door is closed, Figure 5, the separator 28 is disposed at a right angle to the bottle receiver 21, and when the door 23 is swung to the open position, Figure 5, the separator 28 passes between the bottle in the receiver 21 and the adjacent upper bottle, the movement of the separator in that direction being limited by contact with the partition 15¹.

The separator is provided at its inner or free end with a depending angularly arranged ejector 29¹, rigidly attached thereto, and preferably formed integral therewith. This angularly arranged ejector is adapted to be forced behind the bottle, and travels in the space at the rear of the receiver 21, and will force the bottle outwardly, a short distance, so that its neck will be positioned within the vending opening, to be conveniently engaged by the customer.

The arrangement of the vending doors 23 is such that a number of customers may operate the machine, at the same time. Each customer inserts a coin into the slot 27, and actuates the coin controlled lock device 26, as by turning the knob of the same, whereby the door is unlocked. The vending door is then shifted to the open position. The separator or plate 28 will now pass over the lowermost bottle within the receiver 21, supporting the next upper bottle. As the separator 28 is forced between the bottle, the angularly arranged ejector 29¹ slidably engages with the rear end of the bottle, forcing it forwardly slightly, whereby the neck of the bottle is positioned within the vending opening, to be conveniently engaged by the operator, who then completely removes the bottle from the casing. When the vending door is closed, the ejector 28 is shifted from beneath the then lowermost bottle, and the bottles roll down the inclined trays or supports, and the lowermost bottle is again held within the bottle receiver 21.

It is to be understood that the form of my invention, herewith shown and described, is to be taken as a preferred example of the same, and that various changes in the shape size and arrangement of parts, may be resorted to without departing from the spirit of my invention, or the scope of the subjoined claims.

Having thus described my invention, I claim:

1. In a vending machine, a passageway for receiving bottles or the like to travel therein, a receiver arranged near the lower end of the passageway, a horizontally pivoted separator arranged near the receiver to pass between the bottle held therein and the next upper bottle, an angularly disposed ejector carried by the separator to engage with the bottle within the receiver and to shift the same therein without completely removing the bottle therefrom, and means to control access to the bottle.

2. In a vending machine, an inclined passageway for receiving bottles or the like to roll therein, a receiver arranged near the lower end of the passageway, a pivoted horizontally swinging separator arranged near the receiver to pass between the bottle held therein and the next upper bottle, an angularly disposed ejector rigidly mounted upon the separator and adapted to engage behind the end of the bottle within the receiver to shift the same longitudinally, and means to control access to the bottle.

3. In a vending machine, a passageway for receiving bottles, a receiver arranged near the lower end of the passageway, a pivoted door controlling access to the receiver, a horizontally swinging separator bodily mounted upon the door to pass above the bottle in the receiver, and an angularly arranged ejector carried by the separator.

4. In a vending machine, a casing having a vending opening, a horizontally swinging vending door to close the opening, an inclined passageway within the casing, a receiver near the lower end of the inclined passageway and having its end arranged in general alinement with the vending opening, a horizontally swinging separator rigidly mounted upon the vending door and adapted for movement above and across the receiver, and an angularly disposed ejector rigidly secured to the separator and depending therefrom.

5. In a vending machine, a casing, an upstanding passageway formed therein and having a substantially greater vertical dimension than horizontal dimension, said passageway embodying inclined trays having longitudinal openings formed therein and extending over the major portion of the areas of the same, the openings providing for the free circulation of air and reducing the contact area between the trays and bottles or the like supported thereby, a receiver arranged near the lower end of the passageway, a movable vending door to afford access to the receiver, and a separator connected with the vending door and adapted to move over and across the receiver.

6. In a vending machine, a casing, means dividing the casing into upstanding compartments which have substantially greater vertical dimension than horizontal dimension, relatively short inclined trays disposed in staggered relation in each compartment for providing an inclined passageway, said trays having longitudinal openings formed therein for providing for the circulation of air and to reduce the contact area between the bottles or the like and the trays, a receiver arranged near the lower end of each passageway, a movable vending door for each receiver, and a separator carried by the door and movable above and across the receiver.

7. In a vending machine, a casing, partitions dividing the casing into a plurality of vertical compartments, said partitions having openings for the circulation of air, relatively short inclined trays arranged in each compartment in staggered relation to provide an inclined passageway which has a substantially greater vertical dimension than horizontal dimension, said trays having openings formed therein for the circulation of air and to reduce the area of contact between the trays and bottles or the like supported thereby, a receiver arranged near the lower end of each passageway, a movable vending door for each receiver, a separator carried by the door and movable above and across the receiver, and means to supply a cooling medium to the upper portion of the casing.

8. In a vending machine, a casing, an upstanding passageway formed therein and having a substantially greater vertical dimension than horizontal dimension, said passageway embodying bottle supporting means having longitudinal openings formed therein extending over the major portion of the area of the same, the openings providing for the free circulation of air and reducing the contact area between the trays and bottles or the like supported thereby, a receiver arranged near the lower end of the passageway, a movable vending door for the receiver, a separator connected with the door and moved thereby and adapted to be shifted across the receiver, an ejector carried by the separator and adapted to engage with the bottle or the like to partly shift the same from the receiver, and means to supply a cooling medium to the upper portion of the casing.

9. In an article dispensing machine, a housing, a passageway defined therein and communicating with an article receiver, a discharge opening through said housing, through which articles may be withdrawn, a closure for said opening, movably positioned adjacent said opening, a separator, means whereby the separator may be operated by said closure, said separator adapted when operated by said closure to move relative to the receiver into position to separate an article therein from any others within the housing, and to serve as a stop for other articles, whereby, upon removal of the first mentioned article, other articles are inaccessible through the opening.

10. In an article dispensing machine, a housing, a passageway defined therein, a discharge opening through said housing, through which articles may be withdrawn, a closure for said opening, movably positioned adjacent said opening, a separator, means whereby the separator may be operated by said closure and to swing horizontally, said separator adapted when operated by said closure to be moved horizontally into a position between the two articles to separate an article from any others within the housing, and to serve as a stop for the other articles, whereby, upon removal of the first mentioned article, other articles are inaccessible through the opening.

11. In a dispensing machine, a housing, a passage defined therein, a discharge opening through said housing communicating with said passage through which articles may be withdrawn from the passage, a closure for said opening, movably positioned adjacent said opening, said passage being so disposed that articles are fed downward through it by gravity, a separator, means whereby the separator may be operated by said closure, said separator adapted to be moved into position above the lowest article, said article remaining stationary during the initial movement of the separator, and the separator when in said position operating to separate the lowest article from those above, and to support, and cut off access to, the article above when the closure is in the open position.

12. In a dispensing machine, a housing, a tortuous passage defined therein, a discharge opening through said housing communicating with said passage through which articles may be withdrawn from the passage, a closure for said opening, movably positioned adjacent said opening, said passage so disposed that articles are fed downward through it by gravity, a separator mounted to be operated by said closure, and to move horizontally, said separator adapted to be moved into position above the lowest article, and when in said position to separate the lowest article from those above, and to support, and cut off access to, the article above when the closure is in the open position.

13. In an article dispensing machine, a housing, a passageway defined therein communicating with an article receiver, a discharge opening through said housing, through which articles may be withdrawn, a closure for said opening, movably positioned adjacent said opening, a separator, means whereby the separator may be operated by said closure, said separator adapted when operated by said closure to be moved into position to separate an article in the receiver from any others within the housing, and to serve as a stop for other articles, whereby, upon removal of the first mentioned article, other articles are inaccessible through the opening and an ejector together with means whereby the ejector may be moved by said closure to engage the article in the receiver and to move the article with respect to said receiver in the direction of discharge.

14. In an article dispensing machine, a housing, a tortuous passageway defined therein communicating with an article receiver, a discharge opening through said housing, through which articles may be withdrawn, a closure for said opening, movably positioned adjacent said opening, a separator, means whereby the separator may be operated by said closure, said separator adapted when operated by said closure to be moved into position to separate an article from any others within the housing, and to serve as a stop for other articles, whereby, upon removal of the first mentioned article, other articles are inaccessible through the opening and an ejector, means whereby the ejector may be moved by said closure to engage an article in the receiver to move it with respect to the receiver in the direction of discharge, and means whereby said ejector and said separator move together.

15. In an article dispensing machine a housing adapted to confine a stack of articles, a stationary receiver for supporting the lowermost article in the stack, and means operable to separate the lowermost article from the others in the stack, a door controlling access to said housing and being operatively connected to said last mentioned means to render said article accessible from the exterior of the housing.

Signed at Chicago, in the county of Cook and State of Illinois this 26 day of August, 1930.

RAYMOND M. COPE.